(12) United States Patent
Englund et al.

(10) Patent No.: US 6,879,767 B2
(45) Date of Patent: Apr. 12, 2005

(54) METHOD AND AN ARRANGEMENT FOR MANUFACTURING OPTICAL FIBER ASSEMBLIES

(75) Inventors: Lars Englund, Täby (SE); Johan Kullberg, Stockholm (SE); Joakim Westlund, Täby (SE); Jan Martinson, Waxholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/489,844
(22) PCT Filed: Sep. 25, 2002
(86) PCT No.: PCT/SE02/01747
§ 371 (c)(1),
(2), (4) Date: Mar. 15, 2004
(87) PCT Pub. No.: WO03/027738
PCT Pub. Date: Apr. 3, 2003

(65) Prior Publication Data
US 2004/0234230 A1 Nov. 25, 2004

(30) Foreign Application Priority Data
Sep. 28, 2001 (SE) .............................. 0103267

(51) Int. Cl.$^7$ ................................................. G02B 6/00
(52) U.S. Cl. ........................................ 385/147; 385/97
(58) Field of Search ........................... 385/95–99, 147; 250/227.11

(56) References Cited

U.S. PATENT DOCUMENTS 5,258,613 A * 11/1993 Okada et al. .......... 250/227.11

* cited by examiner

*Primary Examiner*—Phan T. H. Palmer

(57) ABSTRACT

A method and an arrangement in which the assemblies or assembly parts like fiber lengths, opto- and optoelectronic components are transferred between processing modules (46). The assembly parts (22) including a fiber length (23, 24) are arranged on a pallet means (14), which is transferred on a track (16) between the different processing modules. A free end (25, 26) of the optical fiber length is picked up by a robot device (40) and is processed at one of the processing modules. Finally, the robot device holding the fiber end and the pallet means are transferred to another processing module in a common sequence.

10 Claims, 5 Drawing Sheets

METHOD AND AN ARRANGEMENT FOR MANUFACTURING OPTICAL FIBER ASSEMBLIES

TECHNICAL FIELD

This invention relates to a method and an arrangement for manufacturing optical fiber assemblies in which the assemblies or assembly parts like fiber lengths, opto- and optoelectronic components are transferred between processing modules.

BACKGROUND OF THE INVENTION

The continues increase of the use of optical fibers in the area of tele- and data communication has created a demand for more efficient production of many products related to communications by fiber. One important such a product is various kinds of assemblies including fiber lengths. Typical assembly products are, optical amplifiers and optical couplers but also laser modules, receiver modules and integrated transmitter modules. The number of these and other opto- and optoelectronic assemblies that comprise one or more fiber lengths is increasing but still there is not known any solution for large scale production.

A common way of manufacturing fiber optic assemblies is to bring the fiber lengths by hand to the different preparation tools needed for providing appropriate connections to components or with another fiber length. Another approach is to bring at least most of the tools one by one to the operator. Examples of such tools are: cutters for cutting the fiber, strippers for removing parts of the cladding, splicers for connecting two fiber ends and recoaters for recoating of a spliced fiber.

An optical communication fiber normally consists of a glass fiber core of about 125 microns and a coated cladding thereon giving a total fiber diameter of about 250 microns. The cladding or coating is made of two layers of acrylate one inner and softer layer and one outer and harder layer. The coating is necessary for protecting the fiber core and for providing tensile and bending strength to the fiber. The optical fibers are still quite delicate products and the same applies to many opto- and optoelectronic components. A problem with today's mainly manual handling of fiber lengths and components is that they often get damages and have to be sorted out. Another problem is that the production is limited as to capacity and the quality is very much dependant on the operator's skill.

SUMMARY OF THE INVENTION

The main object of the present invention is to provide a method and an arrangement that enable a high degree of automation when manufacturing optical fiber assemblies. Another object is to provide a method and an apparatus that is adapted for smooth and gentle handling of all parts included in the assemblies during the manufacture and still another object is to achieve a method and an apparatus that provide a higher and more even quality of the fiber assemblies.

Briefly, these objects of the present invention are accomplished by a method and an arrangement in which the assemblies or assembly parts like fiber lengths, opto- and optoelectronic components are transferred between processing modules. The assembly parts including a fiber length are arranged on a pallet means, which is transferred on a track between the different processing modules. A free end of the optical fiber length is picked up by a robot device and is processed at one of the processing modules. Finally, the robot device holding the fiber end and the pallet means are transferred to another processing module in a common sequence.

An advantage of the present invention is that it enables gentle and careful handling of fiber lengths and components during the whole process of manufacturing optical fiber assemblies. Another advantage is that the manufacturing schedule or setup is easy to change by changing processing modules or the processing order between the modules. A further advantage is the possibility to have a fully automatic production and means for running correction of the same without any interruptions. Yet another advantage is that most kinds of processing including splicing can be carried out by one and the same production line. Still another advantage is that a number of pallet means can be processed at the same time, at different processing modules, under transportation on the tracks and in storage or circulation.

Other objects, advantages and novel features of the invention will become apparent from the following detailed description when considered in conjunction with the accompanying drawings and claims.

BRIEF DESCRIPTION OF THE DRAWINGS

The invention will be described more in detail with reference to the following drawings, in which.

DETAILED DESCRIPTION OF THE INVENTION

Figure 1:
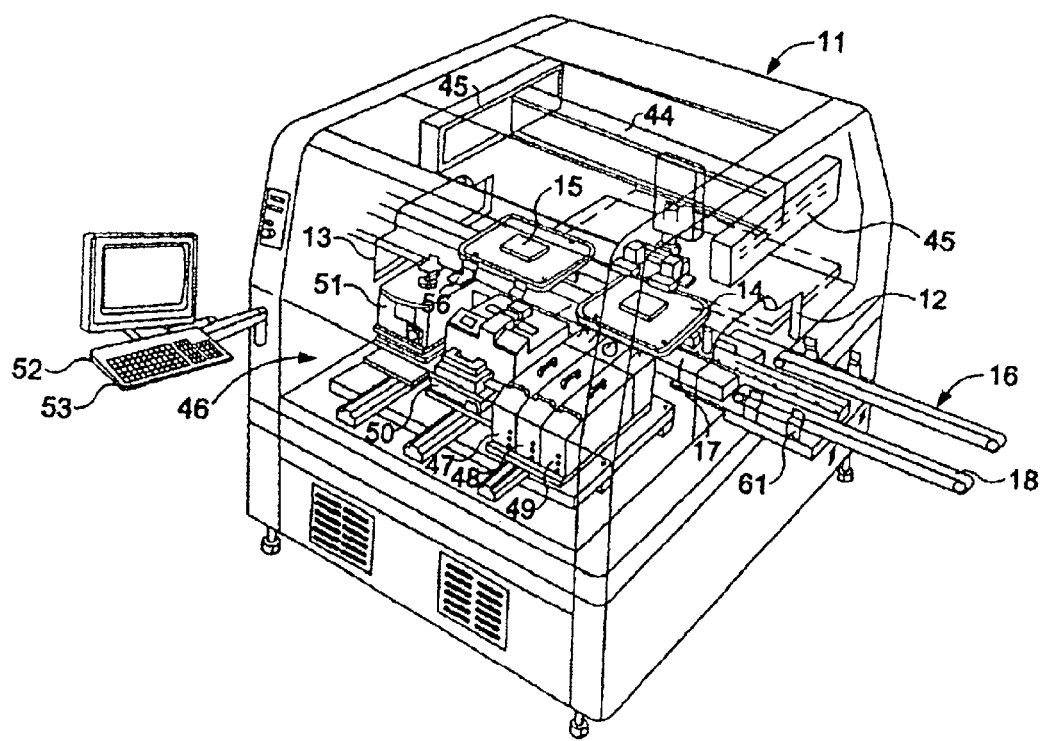
FIG. 1 is a perspective view on a processing cell including processing modules according to the invention.
Figure 2:
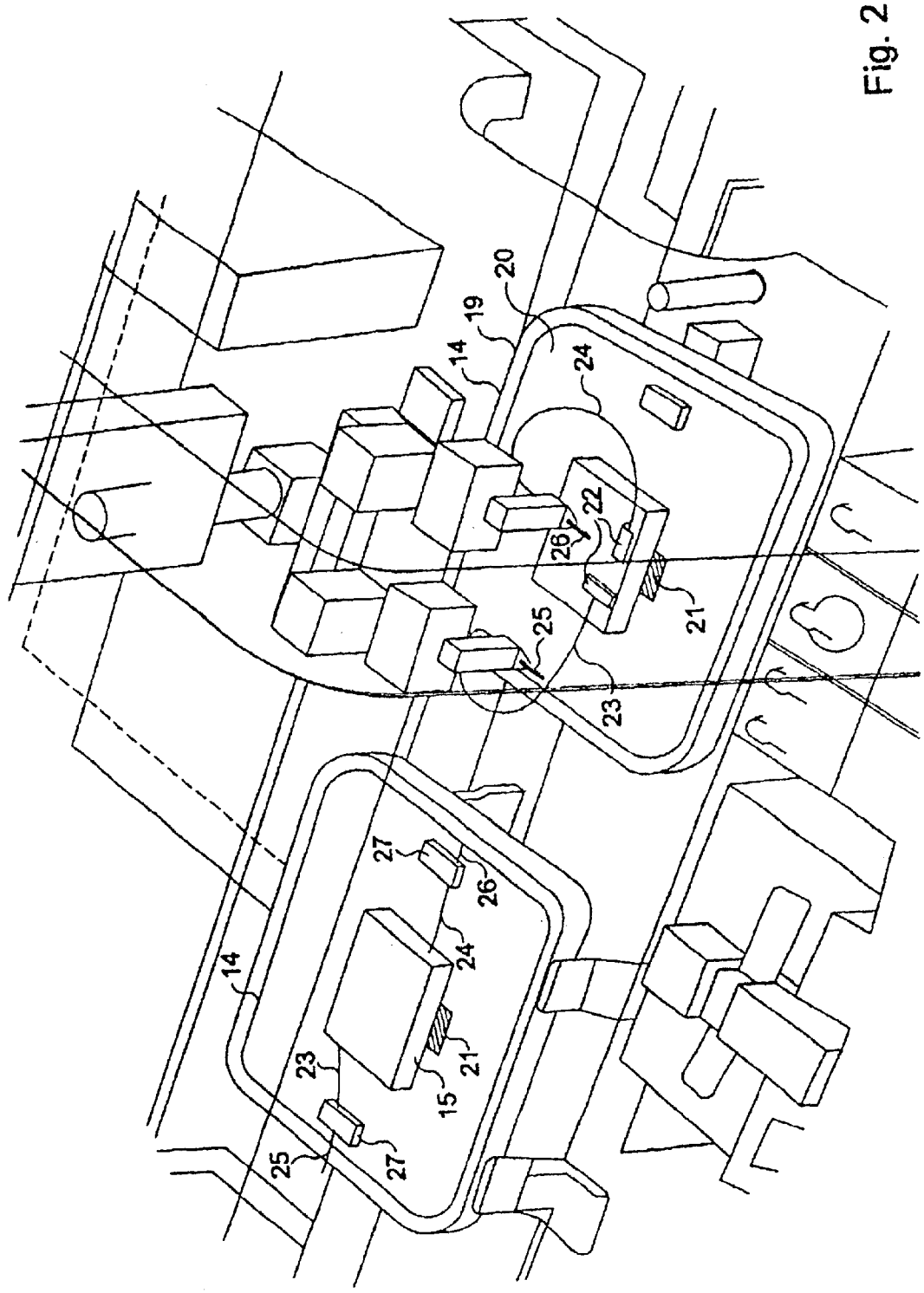
FIG. 2 is an enlarged detail of FIG. 1.
Figure 3:
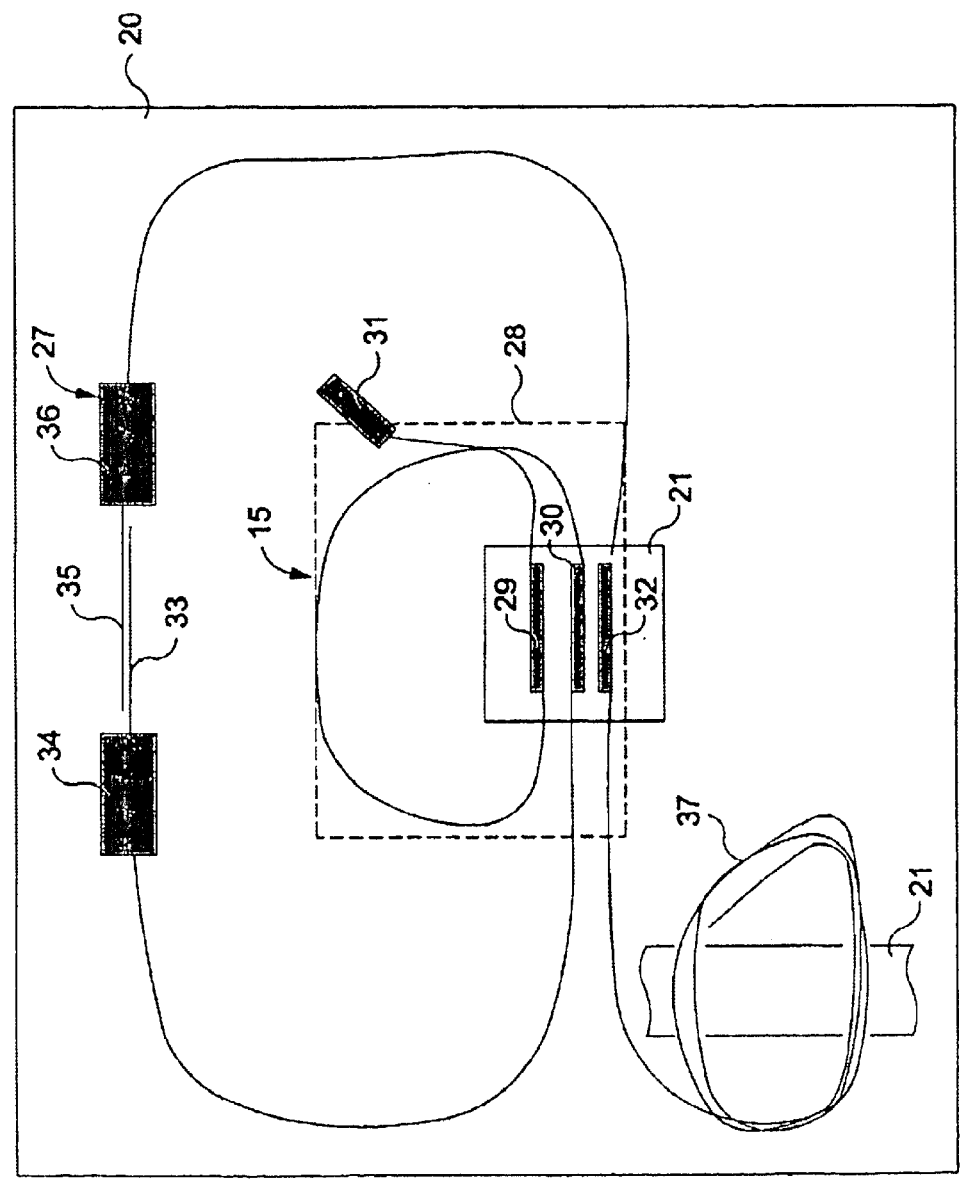
FIG. 3 is a schematic overview of a pallet means according to the invention.

In FIG. 1 there is shown a fiber processing cell 11 comprising an inlet 12 and an outlet 13 for pallet means 14 that are arranged for distributing optical fiber assemblies 15 to and from the cell. The pallet means 14 are guided on a track 16 within and outside the cell 11, said track being a transfer track 17 in the cell and a conveyor means 18 on the outside. Referring to FIGS. 2 and 3, the pallets means is preferable a metallic plate 19 with an upper planar surface 20 having attaching means 21 for holding assembly parts 22 in a fixed position on the surface. Typical assembly parts are lengths 23, 24 of optical fiber, and different opto- and optoelectronic components. In order to hold the free ends 25, 26 of the fiber lengths in a fixed position the attaching means include separate holders 27 e.g. a clip for holding the ends close to the pallet surface. In FIG. 3 there is shown a typical layout of assembly parts 22 on the pallet. The optical fiber assembly under construction is symbolized by the dotted line 28. Two components 29, 30 and a connector 31 are so far installed and joint together by optical fiber lengths. A third component 32 is to be joint with the others in the next processing step and for that reason a free fiber end 33 from the second component 30 is fixed in a first clip 34 and another free end 35 from the third component 32 is fixed in a second clip 36. The third component is also connected with a further length 37 of fiber that for the moment is attached to the pallet awaiting a further mounting step in which the length will be spliced to a fiber of a further component.

The transfer track 17 comprises a suitable transfer means 38, e.g. an Archimedian screw device for transferring a carriage means 39 (FIG. 4) for the pallets 14 along the track. The conveyor means 18 comprises e.g. endless belts or roller ways.

A robot device 40 is arranged above the transfer track 17 and includes two gripping means 41, 42 mounted on a robot arm 43, which is movable along a first girder 44 in the upper part of the cell. Said first girder is in turn movable along second girders 45 directed transversely to the first girder. The shown robot device is a Cartesian robot of a kind known per see but also other robot devices may be applicable. The gripping means are adapted to lift and bring the free fiber ends 25, 26 to different processing modules 46 located at one side of the transfer track 17. In this case the cell holds five processing modules, a module 47 for straightening the fiber and stripping the coating from the core, a module 48 for cleaning the fiber by ultrasonics, a module 49 for cleaving the fiber, a module 50 for splicing two fiber ends and a module 51 for recoating of spliced fiber ends. The movements of the gripping means are preset and controlled by a computer means 52 including a control unit 53 for the transfer means 38. The movements of the robot arm with its gripping means and the transfer of the pallet means are synchronized in such a way that all movements of the gripping means along the transfer track starts a corresponding transfer of the carriage means 39 carrying the pallet means.

Figure 4:
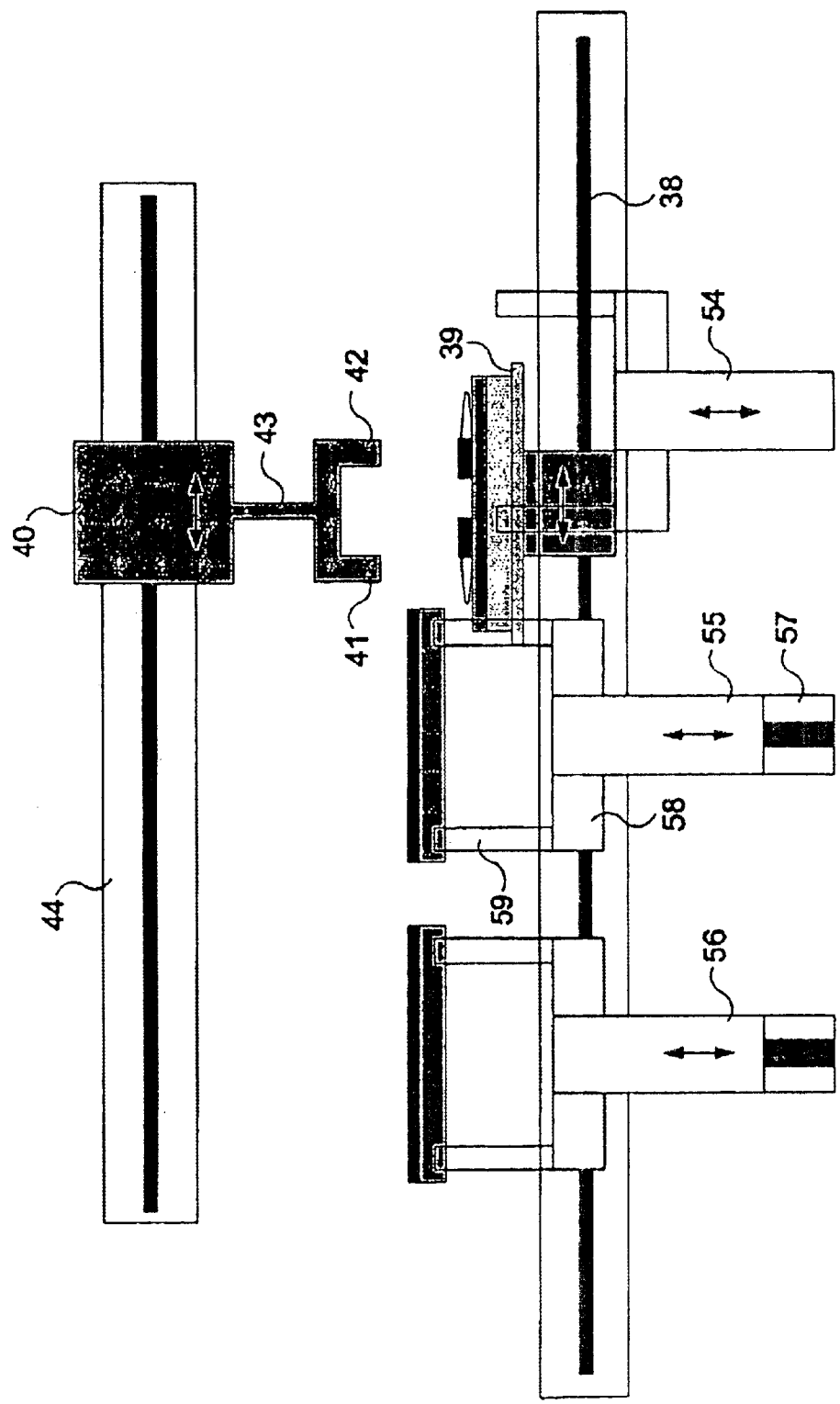
FIG. 4 is a schematic side view of pallet means, a track, a robot device and lifting means in a processing cell according to the invention

Referring to FIG. 4, each processing cell 11 will have a carriage 39 that is movable along the transfer track 17 and is driven by the transfer means 38. As mentioned above the robot device is programmed to possess a number of processing steps in the cell and the control unit 53 is programmed to register all movements of the robot arm in the direction along the track and direct the transfer means 38 to transfer the carriage 39 with the pallet means a corresponding distance. The total processing in the cell often means that the robot arm has to go back and forth along the track several times before the assembly is ready to leave the cell. It is also an evident advantage in terms of capacity if more than one pallet can be processed at the same time in the cell. For these reasons and the reason that the inlet 12 and outlet 13 can be united on the same side, a changing mechanism is arranged for changing the order of the pallets and let one pallet pass another. Said mechanism comprises in the embodiment according to FIG. 4 three lifting devices 54, 55, 56 located at three different stop stations along the track 17. Each lifting device comprises a suitable lifting system 57 e.g. a lifting cylinder and a frame 58 with four upright arms 59 that are adapted to come into lifting engagement with the pallet when the lifting frame is moved from its lower position, shown by device 54, to its upper position, shown by devices 55, 56. In the upper position, a free space is created between the pallet and the track allowing the carriage means 39 with a second pallet 14b to pass under the first pallet 14a. When being in the upper position some processing steps may continue e.g. splicing and testing while the assembly on the second pallet may be subjected to another treatment in another processing module.

Figure 5:
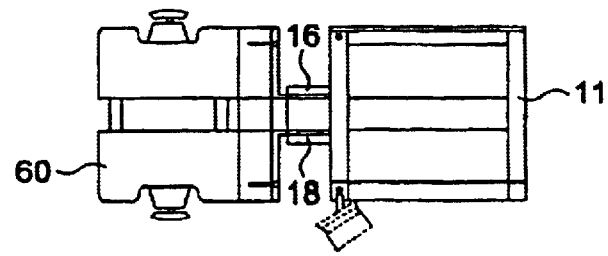
FIG. 5 is a schematic overview of an arrangement for manufacturing optical fiber assemblies according to the invention.
Figure 6:
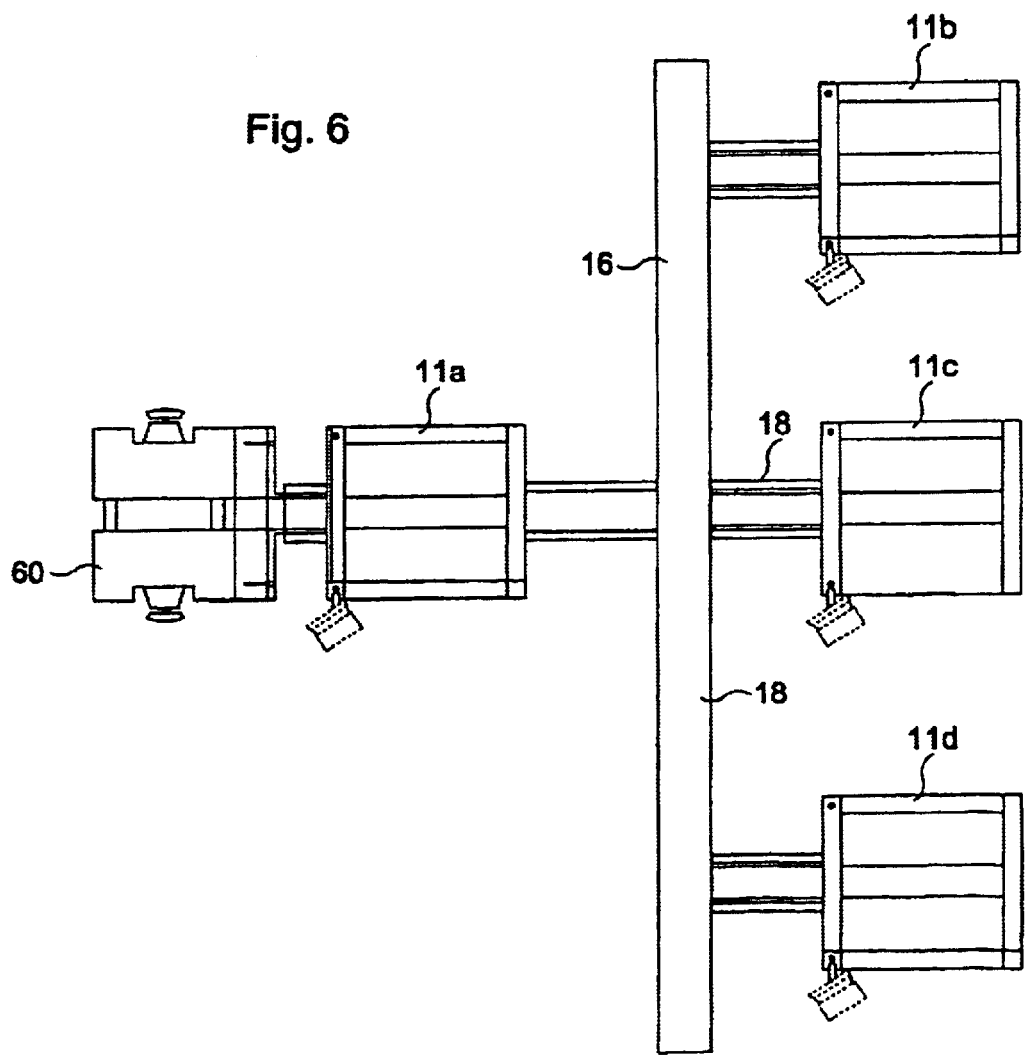
FIG. 6 is a schematic overview of another arrangement for manufacturing optical fiber assemblies according to the invention.

The processing modules can be grouped together in many ways, and in FIG. 5 a structure can be seen that includes a manual in- and output cell 60 and a processing cell 11 with at least two processing modules. In FIG. 6 the structure is more complicated and includes one manual in- and output cell 60 and four processing cells 11a, 11b, 11c and 11d. The cells are connected by conveyor means 18 into a network that also could include not shown pallet storage and/or pallet changing means.

The manufacture of an optical fiber assembly according to the shown embodiment of the invention starts with that the operator at the in- and output cell 60 puts a first component e.g. 31 and a second component e.g. 29 each one with extending fiber lengths on the pallet means 14. The components are secured in a fixed position on the pallet surface by the attaching means 21 e.g. some adhesion product and the two fiber ends from the two components that are to be connected are placed in the clips 27. The pallet is then transferred to the conveyor means 18, which moves the pallet to the inlet 12 of the processing cell 11. In this position the pallet is changed over to the carriage means 39 included in the transfer means 38 e.g. by means of a lifting device 61 as shown in FIG. 1. The transfer means moves the pallet to the first processing module, which in this case is the straightening and stripping module 47 and the robot device 40 is activated to grip the fiber ends 25, 26 and move them one by one to the module. After that the robot arm moves the fiber ends to the next processing module e.g. 48 and the control means 53 is arranged to simultaneously move the carriage means 39 with the pallet means in order to avoid any unnecessary stretching or bending of the fiber lengths.

When all processing steps in the cell 11 are passed the pallet is returned to the in- and output cell 60 on the same track 16 and an additional component with fiber lengths is placed on the pallet. The new two fiber ends that are to be spliced are put in the clips 27 and the transfer and processing procedure is performed in the same way again. Further components are added, mostly one by one, and the assembly is built up to its final structure while the pallet means move like a shuttle between the in- and output cell 60 and the processing cell 11.

To increase the productivity it is often necessary to process many pallets at the same time and then the pallet exchange mechanism with the pallet lifters 54, 55, 56 enables a flexible programming of the flow of pallets through the whole system. If an even higher productivity is needed a layout according to FIG. 6 is advantageous and a further step could be to introduce robot devices in the in-and output cell in order to achieve a fully automated production line.

What is claimed is:

1. A system for manufacturing optical fiber assemblies in which assemblies or assembly parts like fiber lengths, opto- and optoelectronic components are transferred between processing modules, said system comprising:

a pallet means for carrying assembly parts including a length of the optical fiber;

a track for guiding the pallet means;

a transfer means for transferring the pallet means on the track between the different processing/modules;

a robot device for picking up a free end of the optical fiber and bringing it to and from one of the processing modules; and a control unit for controlling the transfer means and the robot device in order to synchronize the transfer of the pallet means and the movement of the robot device holding the fiber end when the pallet means is transferred to another processing module.

2. The system for manufacturing optical fiber assemblies according to claim 1, wherein a lifting device is arranged on at least one station along the guiding track for lifting one pallet means to an upper position above the track and leaving a free space between the pallet and the track, and wherein the transfer means is arranged to transfer a second pallet along the track through the free space.

3. The system for manufacturing optical fiber assemblies according to claim 1, wherein the pallet means comprises attaching means for fixing the assembly parts on an upper surface of the pallet means, and holder means for fixing each free fiber end.

4. The system for manufacturing optical fiber assemblies according to claim 1, wherein the robot device comprises a robot arm that is movable above and in parallel to the track and the arm includes two gripping means, each one arranged for lifting and holding a free fiber end.

5. The system for manufacturing optical fiber assemblies according to claim 1, wherein two or more processing modules are arranged in a processing cell, said two or more processing cells connected by pallet conveyor means to a processing network, wherein one of said cells is arranged for supplying new assembly parts to the network and for receiving assemblies from the network, and wherein at least one processing cell is arranged for splicing fiber ends.

6. A method for manufacturing optical fiber assemblies in which the assemblies or assembly parts like fiber lengths, opto- and optoelectronic components are transferred between processing modules, said method comprising the steps of:

arranging assembly parts including a fiber length on a pallet means;

transferring the pallet means on a track between the different processing modules;

picking up a free end of the optical fiber by means of a robot device;

processing the fiber end at one of the processing modules;

transferring the robot device holding the fiber end and the pallet means to another processing, module in a common sequence.

7. The method for manufacture optical fiber assemblies according to claim 6, further comprising the steps of:

transferring the pallet means into a processing cell including two or more processing modules; and processing two or more pallets means at the same time in the cell.

8. The method for manufacture optical fiber assemblies according to claim 7, further comprising the steps of:

introducing and transferring the pallet means in a certain order along the track in the processing cell;

changing said order by bringing one pallet means into an upper position above the track and leaving a free space between the track and the pallet means; and transferring a second pallet means along the track and passing the second pallet means under the first pallet means through the free space.

9. The method for manufacture optical fiber assemblies according to claim 7, further comprising the steps of:

processing an optical fiber assembly in two or more processing cells;

connecting components to fiber lengths in one of said cells;

splicing fiber ends in another of said cells; and transferring the pallets with the assemblies between the cells by conveyor means.

10. The method for manufacturing optical fiber assemblies according to claim 6, said method further comprising the step of transferring the pallet means synchronized and in parallel with the robot device when the robot device is transferred between said two processing modules.

* * * * *

UNITED STATES PATENT AND TRADEMARK OFFICE
CERTIFICATE OF CORRECTION

PATENT NO. : 6,879,767 B2
APPLICATION NO. : 10/489844
DATED : April 12, 2005
INVENTOR(S) : Lars Englund et al.

It is certified that error appears in the above-identified patent and that said Letters Patent is hereby corrected as shown below:

In Column 1, line 15, delete "continues" and insert -- continuous --, therefor.

In Column 6, Line 2, in Claim 6, after "processing" delete ",".

Signed and Sealed this

Thirtieth Day of October, 2007

JON W. DUDAS
*Director of the United States Patent and Trademark Office*